(12) United States Patent
Norman et al.

(10) Patent No.: US 11,926,542 B2
(45) Date of Patent: *Mar. 12, 2024

(54) CONTROLLED REMOVAL OF IONS FROM AQUEOUS FLUID

(71) Applicant: The Water Company, LLC, Pueblo, CO (US)

(72) Inventors: Peter Robert Norman, Pueblo West, CO (US); Brian Bruce Elson, Pueblo, CO (US); Michael James Fallbach, Woodland Park, CO (US)

(73) Assignee: The Water Company, LLC, Pueblo, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,028

(22) Filed: Jul. 14, 2021

(65) Prior Publication Data

US 2021/0340036 A1 Nov. 4, 2021

Related U.S. Application Data

(63) Continuation of application No. 16/439,381, filed on Jun. 12, 2019, now Pat. No. 11,091,379.

(Continued)

(51) Int. Cl.
*C02F 1/52* (2023.01)
*C01B 3/50* (2006.01)
(Continued)

(52) U.S. Cl.
CPC .............. *C02F 1/5236* (2013.01); *C01B 3/50* (2013.01); *C02F 1/001* (2013.01); *C02F 1/5209* (2013.01);
(Continued)

(58) Field of Classification Search
CPC .... C02F 1/5209; C02F 1/5236; C02F 1/5281; C02F 2209/02; C02F 2209/05; C02F 2209/06
See application file for complete search history.

(56) References Cited

U.S. PATENT DOCUMENTS 4,310,406 A 1/1982 Smith
5,547,588 A 8/1996 Hassett
(Continued)

FOREIGN PATENT DOCUMENTS

CA 2939399 A1 9/2015
CL 2015001668 A1 10/2015
(Continued)

OTHER PUBLICATIONS

AU Acceptance letter received for Application No. 2019287495, 3 pages.
(Continued)

*Primary Examiner* — Bradley R Spies
(74) *Attorney, Agent, or Firm* — Baker Botts L.L.P.

(57) ABSTRACT

Methods and systems for removal of ions from aqueous fluids are provided. In certain embodiments, the present disclosure provides a method of removing one or more oxyanions from an aqueous fluid, including the steps of contacting an aqueous fluid containing oxyanions with an aluminum metal whereby aluminum ions are released from the aluminum metal into the aqueous fluid, wherein the one or more oxyanions in the aqueous fluid react with the aluminum ions to form one or more ettringites; controlling a rate of release of the aluminum ions from the aluminum metal; and removing at least a portion of precipitated ettringites from the aqueous fluid.

46 Claims, 2 Drawing Sheets

Related U.S. Application Data

(60) Provisional application No. 62/684,370, filed on Jun. 13, 2018.

(51) Int. Cl.
*C02F 1/00* (2023.01)
*C02F 101/10* (2006.01)
*C02F 103/06* (2006.01)
*C02F 103/10* (2006.01)

(52) U.S. Cl.
CPC ...... *C02F 1/5281* (2013.01); *C02F 2001/007* (2013.01); *C02F 2101/101* (2013.01); *C02F 2103/06* (2013.01); *C02F 2103/10* (2013.01); *C02F 2209/02* (2013.01); *C02F 2209/05* (2013.01); *C02F 2209/06* (2013.01); *C02F 2209/19* (2013.01)

(56) References Cited

U.S. PATENT DOCUMENTS

| | | |
|---|---|---|
| 6,210,589 B1 | 4/2001 | Lee |
| 6,280,630 B1 | 8/2001 | Ramsay |
| 7,144,567 B2 | 12/2006 | Andersen |
| 2013/0319951 A1 | 12/2013 | Smith |
| 2014/0116954 A1 | 5/2014 | Elson |
| 2014/0246371 A1 | 9/2014 | Cao |
| 2014/0251906 A1 | 9/2014 | Ergang |
| 2016/0068414 A1 | 3/2016 | Ergang |
| 2016/0069220 A1 | 3/2016 | Wain |

FOREIGN PATENT DOCUMENTS

| | | |
|---|---|---|
| CL | 2015001976 A1 | 11/2015 |
| CL | 2017000514 A1 | 10/2017 |
| CL | 2018000172 A1 | 4/2018 |
| CN | 101407356 A | 4/2009 |
| CN | 106007046 A | 10/2016 |
| CN | 107673514 A | 2/2018 |
| EP | 0250626 B2 | 9/1996 |
| EP | 3189206 B1 | 10/2020 |
| GB | 1591695 A | 6/1981 |
| WO | WO 2014066603 A1 | 5/2014 |
| WO | WO 2014096549 A1 | 6/2014 |
| WO | WO 2016036390 A1 | 3/2016 |
| WO | WO 2017015678 A2 | 1/2017 |

OTHER PUBLICATIONS

Alfantazi, et al., Enhancing aluminum corrosion in water, Journal of Applied Electrochemistry, J Appl Electrochem (2009) 39:1695-1702, Mar. 17, 2009.

Trevino, et al., Chromium (VI) Reduction Kinetics by Zero-valent Aluminum, Int. J. Electrochem. Sci., 9, Mar. 2, 2014, pp. 2556-2564.

Ren, et al., Enhancing surface corrosion of zero-valent aluminum (ZVAI) and electron transfer process for the degradation of trichloroethylene with the presence of persulfate, Chemical Engineering, vol. 348, Sep. 15, 2018, pp. 350-360.

E. Czech, T. Troczynski, Hydrogen generation through massive corrosion of deformed aluminum in water, International Journal of Hydrogen Energy. vol. 35, Issue 3, Feb. 3, 2010, pp. 1029-1037.

CA office Action received for Application No. 3,103,613 dated Sep. 9, 2021, 6 pages.

Miadokova, et al., Kinetics and Mechanism of the Reaction of Aluminium in Aqueous Solution of Sodium Hydroxide, Chem. Papers, 39(2), pp. 229-235, 1985.

EESR received from EPO for EP Patent Application No. 19819611.5-1101, dated Jan. 25, 2022, 8 pages.

CONTROLLED REMOVAL OF IONS FROM AQUEOUS FLUID

PRIORITY

This application is a continuation under 35 U.S.C. § 120 of U.S. patent application Ser. No. 16/439,381, filed 12 Jun. 2019, which claims the benefit under 35 U.S.C. § 119(e) of U.S. Provisional Patent Application No. 62/684,370, filed 13 Jun. 2018, all of which are incorporated herein by reference.

TECHNICAL FIELD

This disclosure generally relates to the removal of ions from aqueous fluids.

BACKGROUND

Aqueous fluids, such as wastewater, acid mine tailings, groundwater, and the like, can have high concentrations of various ions which can pose significant environmental and health hazards. Thus, removal of ions from aqueous fluids may be required by statute, rule, or regulation before disposal or use of such aqueous fluids.

Dissolved ions can be precipitated from aqueous fluids as ionic compounds, which can then be separated from the aqueous fluids. One class of ionic compounds that can be precipitated is ettringites. Ettringites, which may be commercially useful components of cements, such as Portland cement, are hydrous calcium aluminum sulfate minerals, which can include a mineral with the chemical formula $Ca_6Al_2(SO_4)_3(OH)_{12} \bullet 26H_2O$ and a series of chemically analogous isostructural compounds. Alternatively, ettringites may also be defined as compounds with the formula $Ca_6M_2(OH)_x(A)_y(D)_z \bullet E(H_2O)$, wherein M is one or more trivalent metals, A is one or more oxyanions with one or more charges n–, D is one or more monovalent anions with charge 1–, E is 26 or 32, n is 1, 2, 3, or 4, and x, y, and z are defined such that x+(y•n)+z=18, x>0, y>0, and z>0. When an ettringite contains more than one oxyanion A with different charges n–, then (y)(n) is the sum of the value y for each oxyanion A multiplied by the n values for each respective oxyanion.

One or more ettringites can be formed by adding one or more bases and one or more aluminum salts to an aqueous fluid with dissolved oxyanions A, but this approach has serious drawbacks. Aluminum salts may be relatively expensive, and a process employing such aluminum salts would be prohibitively expensive for treating e.g., wastewater. Further, such salts can also increase the levels of unwanted ions, exacerbating environmental concerns. For example, adding aluminum chloride as the aluminum salt and sodium hydroxide as the base increases the levels of chloride and sodium ions in the aqueous fluid. These additional ions often have to be removed from the aqueous fluid to make the aqueous fluid suitable for reuse or disposal. When the base is a liquid, such as slaked lime, the volume of the aqueous fluid can increase significantly upon addition of the liquid base, which adds to the amount of aqueous liquid that must be processed and disposed.

SUMMARY OF PARTICULAR EMBODIMENTS

In certain embodiments, the present disclosure provides a method of removing one or more oxyanions from an aqueous fluid, including the steps of contacting an aqueous fluid containing oxyanions with an aluminum metal whereby aluminum ions are released from the aluminum metal into the aqueous fluid, wherein the one or more oxyanions in the aqueous fluid react with the aluminum ions to form one or more ettringites; controlling a rate of release of the aluminum ions from the aluminum metal; and removing at least a portion of precipitated ettringites from the aqueous fluid.

In certain embodiments, the present disclosure provides a system including a mixing chamber operable to mix a source of calcium ions and an aqueous fluid that contains one or more oxyanions; a reactor operable to receive the aqueous fluid from the mixing chamber, wherein the reactor contains an aluminum metal; one or more measurement devices operatively connected to the reactor, wherein the measurement devices measure one or more properties of the aqueous fluid in the reactor; an agitation device operable to agitate the aqueous fluid in the reactor; and a controller operatively coupled to the agitation device, wherein the controller operates the agitation device based at least on the measurement taken by the measurement device The embodiments disclosed herein are only examples, and the scope of this disclosure is not limited to them. Particular embodiments may include all, some, or none of the components, elements, features, functions, operations, or steps of the embodiments disclosed herein. Embodiments according to the present disclosure are in particular disclosed in the attached claims directed to a method and a system wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

These drawings illustrate certain aspects of some of the embodiments of the present disclosure and should not be used to limit or define the claims.

Figure 1:
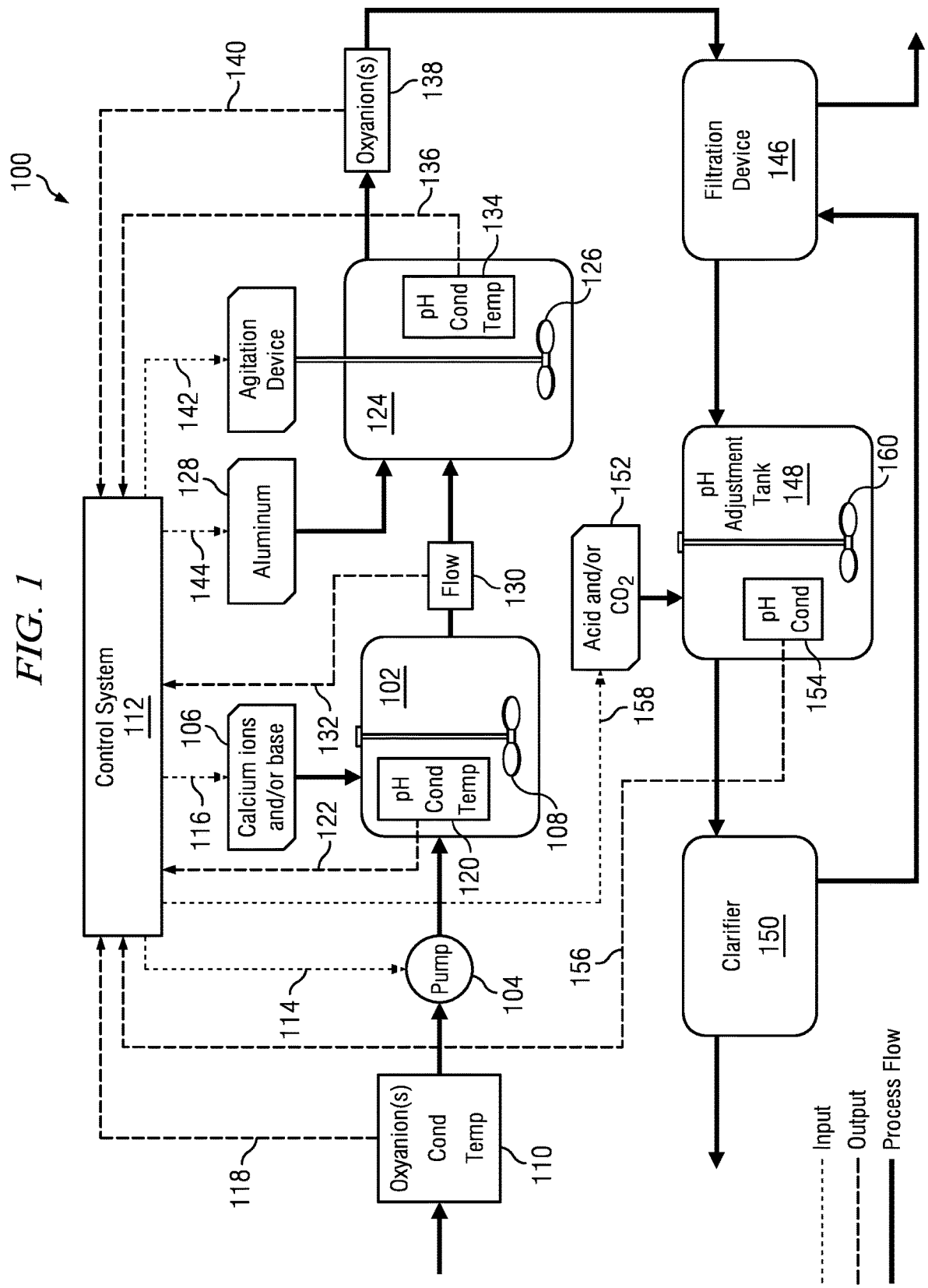
FIG. 1 is schematic representation of one embodiment of an ion removal system in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF EXAMPLE EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosed embodiments.

A simple and robust way to remove ions from aqueous fluids (e.g., waste streams) via the formation of ettringites is described in U.S. Pat. No. 9,656,887, which is incorporated herein in its entirety by reference. That patent describes such a process to remove ions (e.g., oxyanions such as sulfate, chromate, borate, etc.) from aqueous fluid by forming one or more ettringites. The process may comprise increasing the pH of an aqueous fluid containing oxyanions such as sulfate (e.g., by the addition of one or more bases or by electrolysis) and contacting the aqueous fluid with aluminum metal, rather than aluminum salts. At the elevated pH, the aluminum metal may dissolve and react with dissolved oxyanions to form one or more ettringites. The precipitated ettringites may thus effectively remove the oxyanions from the aqueous fluid. Since this process may require the formation of ettringites via an aqueous phase reaction (i.e., using dissolved aluminum ions), and the aluminum ions may be formed in situ from aluminum metal, it may be difficult to control the concentration of dissolved aluminum because the rate of formation of aluminum ions from aluminum metal depends significantly on the surface area and surface activity of the aluminum metal employed. Both surface area and surface activity change over the course of the reaction as the passivating oxide (or other surface coating) of the aluminum is removed, and the size of the individual pieces of aluminum are reduced in size over the course of the reaction. In addition, process economics often dictate that the aluminum be provided in the form of aluminum scrap having variable and unpredictable surface area and degree of surface passivation, further complicating control of process stoichiometry.

Scheme 1 provides a non-limiting example of such a process. The process utilizes the base-assisted oxidation of aluminum metal to provide dissolved $Al^{3+}$ in an aqueous fluid. In specific embodiments, a suitable base to oxidize the aluminum metal is calcium hydroxide. The hydroxide can react with the aluminum metal to produce trivalent aluminum ions ($Al^{3+}$) that react with other ions in solution to ultimately afford insoluble anion-substituted calcium aluminates known as ettringites (Scheme 1).

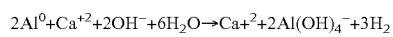

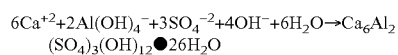

Scheme 1:

The rate of $Al^{3+}$ released from the aluminum metal into the solution as aluminate ions ($Al(OH)_4^-$) governs the rate of the overall reaction and amount of anion-substituted calcium aluminates (i.e., ettringites) that can form. In the particular example shown, the reaction proceeds by the addition of calcium hydroxide, which provides the calcium ions and hydroxide necessary to drive the reaction. When the reaction occurs in the presence of sulfate anions, an ettringite with the indicated stoichiometry forms and precipitates from the aqueous fluid (Scheme 1, step 2).

In order to optimize process economics, the stoichiometry between aluminum ions, calcium, ions, and the ions being removed should be maintained in a ratio consistent with the ettringite being formed. Adding excess aluminum may increase the overall process cost, and can also make it necessary to further treat and remove excess aluminum (not consumed in the ettringite reaction) from the process stream. Conversely, adding too little aluminum may result in undertreating the process stream, such that oxyanions (e.g., sulfate) remain in the aqueous fluid at levels exceeding, for example, permitted regulatory levels. In addition, as a practical matter, the inability to control process stoichiometry by increasing or decreasing the rate of formation of aluminum ions (i.e., aluminum corrosion rate) would provide a process that cannot respond to changes in process conditions (e.g., changes in sulfate levels) that would be expected in "real-world" applications. The present embodiments provide, among other things, methods for controlling the stoichiometry of a process for removing oxyanions such as sulfate from aqueous liquids, Unlike the cost-prohibitive processes that use aluminum salts that are soluble under aqueous conditions, the cost-effective processes described herein may rely on a heterogeneous reaction between insoluble aluminum metal and water-soluble components such as calcium hydroxide and sulfate ions. How to maintain a stoichiometric supply of aluminum ions to match the concentration of sulfate or other ions being removed was hitherto unknown. However, the surface of aluminum may undergo rapid passivation that results in an adhering oxide layer (e.g., precipitate) that prevents reactivity. In addition, the aluminum metal can be coated with other inactivating layers such as debris and other deposits from the fluid medium that can restrict surface access. Furthermore, even when a reactive aluminum surface is available, a substantially constant rate of aluminum ion release may be challenging to maintain due to the constantly changing shape, size, and surface area of the aluminum metal as it is oxidized and used.

Maintaining process stoichiometry by increasing or decreasing the aluminum ion release-rate may also be challenging because of conditions that arise in "real world" applications. Variables such as the flow rate of the aqueous fluid, the concentration of ions being removed, and operating temperature may all change during the course of the process. Fluctuations that occur can alter the required amount of aluminum ions needed in solution. Being able to respond to such changes in a cost-effective, efficient way therefore may require a dynamic process where the rate of aluminum ion release can be readily adjusted (i.e., up, down, or at a substantially constant rate while compensating for changes in aluminum metal surface area and surface activity). In various embodiments, such adjustments may be required under continuous flow conditions.

In various embodiments of the present disclosure, stoichiometric or near-stoichiometric refers generally to the condition where ions such as calcium, sulfate, and aluminate may be present in amounts needed to efficiently form precipitated ettringites, without insufficient and/or excess amounts of reactants, particularly aluminum. In particular embodiments, it may be desirable to provide an amount of aluminum ions such that the formation of ettringite can be carried out in a manner that leaves no excess aluminum ions in solution, and where only the desired (i.e., end-user targeted or environmentally acceptable) levels of oxyanions remain in the aqueous fluid. In a non-limiting illustrative example, this can be accomplished in practice by measuring the concentration of sulfate or other anions to be removed from the aqueous fluid. The amounts of calcium and aluminum required to form ettringite with the available oxyanions may then be calculated. In one embodiment, calcium hydroxide or slaked calcium oxide may be introduced into the fluid to be treated based on the stoichiometric amounts of calcium and hydroxide needed to make the mineral ettringite, e.g., $Ca_6Al_2(SO_4)_3(OH)_{12} \bullet 26H_2O$, and/or to raise the pH to an optimal level. Accordingly, in various embodiments, calcium ions are introduced in about a 2:1 molar ratio with the sulfate ions being removed in order to precipitate an ettringite having the exemplified molecular formula. However, in other embodiments, amounts of calcium hydroxide greater than a stoichiometric amount can be necessary when a portion of the calcium hydroxide is consumed by non-ettringite components of the aqueous fluid or by the flocking out of some metals. In such cases, the molar ratio of calcium to sulfate can be greater than about 2:1. The mass of aluminum needed for the stoichiometric process (i.e., to facilitate a 1:1.5 ratio of aluminum ions to sulfate ions established by the ettringite formula) may be determined by calculating the aluminum oxidation rate under certain test conditions. As described throughout the present disclosure, numerous processes may be used to maintain the rate of aluminum ion release at a level that balances the stoichiometry of the dissolved aluminum ions with the concentration of sulfate ions being removed.

Furthermore, in various embodiments, the present disclosure also provides for an ion removal process that may result in the precipitation of isostructural analogs of the above ettringite. In some embodiments, all or part of the aluminum can be substituted with one or more trivalent metal cations such as Fe(III), Mn(III), and Cr(III). In some embodiments, all or part of the calcium can be substituted with one or more divalent metals, such as $Mg^{2+}$. In other embodiments, all or part of the hydroxide can be substituted with one or more monovalent anions ions, such as chloride, fluoride, iodide, and bromide. In still other embodiments, all or part of the sulfate can be substituted with one or more other oxyanions, such as chromate, selenate, borate, and/or carbonate. As a non-limiting example, a boron containing ettringite can have a borate oxyanion in place of one or more sulfate anions. Also, the amount of water of hydration may vary somewhat.

As varying ettringite compositions are possible, the stoichiometric molar ratios of the ionic components in the aqueous fluid can vary according to the formula of the ettringite being formed by the reaction. In various embodiments, ettringites can also be generally defined as compounds with the formula $Ca_6M_2(OH)_x(A)_y(D)_z \bullet E(H_2O)$, wherein M is one or more trivalent metals, A is one or more oxyanions with one or more charges n−, D is one or more monovalent anions with charge 1−, E is 26 or 32, n is 1, 2, 3, or 4, and x, y, and z are defined such that $x+(y \cdot n)+z=18$, $x>0$, $y>0$, and $z \geq 0$. When an ettringite contains more than one oxyanion A with different charges n−, then (y)(n) is the sum of the value y for each oxyanion A multiplied by the n values for each respective oxyanion. Accordingly, in some embodiments, the molar ratio of aluminum to sulfate in an ettringite can be about 1 to greater than about 2.

In various embodiments, to ensure substantially complete removal of an oxyanion such as sulfate from an aqueous fluid, a molar ratio of about 1.5:1 sulfate to aluminum ions may be maintained in solution during the ion-removal process. At such a ratio (stoichiometric), the quantity of aluminum present may be sufficient to treat all or essentially all of the sulfate in the aqueous fluid. However, in other embodiments, this ratio can vary depending on the amount of sulfate that can acceptably (e.g., based on regulatory guidelines or end-user targeted levels) be left untreated in the aqueous fluid. Accordingly, in some embodiments, the molar ratio of sulfate to aluminum in the aqueous fluid being treated may be greater than or equal to about 1.5:1. In other embodiments, the molar ratio of sulfate to aluminum in the aqueous fluid being treated may be in a range of from about 1.5:1 to about 2:1. Importantly, even under conditions that leave residual sulfate remaining in the aqueous fluid, no excess aluminum may be present and ettringite may form in an efficient, cost-effective manner.

The molar ratio of sulfate to calcium in the aqueous fluid can also vary accordingly to account for the targeted level of sulfate removal, ranging from conditions that result in complete removal of sulfate (stoichiometric) to conditions where a percentage of sulfate is left untreated in the aqueous fluid. For example, in some embodiments, the molar ratio of sulfate to calcium in the aqueous fluid being treated is about 0.5:1, wherein at said ratio the amount of calcium present is sufficient to treat the entire amount of sulfate in the aqueous fluid. In other embodiments, the molar ratio of sulfate to calcium in the aqueous fluid being treated may be greater than or equal to about 0.5:1. In still other embodiments, the molar ratio of sulfate to calcium in the aqueous fluid being treated may be in a range of from about 0.5:1 to about 1:1, including all ranges and values therebetween. In another embodiment, the molar ratio of sulfate to calcium in the aqueous fluid being treated may be in a range of from about 0.5:1 to about 0.6:1, including all ranges and values therebetween. While sulfate may remain in the aqueous fluid at ratios greater than 0.5:1 sulfate to calcium, substantially no excess calcium or aluminum may be present under these conditions, resulting in an efficient, cost-effective ion removal process.

Described below are various process designs are that may be useful in carrying out the ion removal process. A skilled artisan will understand that such processes can be implemented in any of numerous ways. While certain sequences may be implied, the processes may be ordered according to any suitable sequence. Embodiments ordered in a manner different from those explicitly described are encompassed by the present disclosure. Furthermore, while certain processes may be explained in the context of removing sulfate ions, other ions can also be removed.

In various embodiments, the processes disclosed herein can be carried out in a batch, semi-batch, semi-continuous, or continuous mode. In certain embodiments, the processes disclosed herein are carried out in batch mode. In certain other embodiments, the processes disclosed herein are carried out in semi-batch mode. In still other embodiments, the processes disclosed herein are carried out in semi-continuous mode. In yet other embodiments, the processes disclosed herein are carried out in continuous mode. Process economics may be optimized when at least part of the ion removal process is operated in continuous mode. However, in certain embodiments, process economics may be optimized when the entire ion removal process is operated in continuous mode. In some embodiments, it may be advantageous to carry out the process using a combination of modes, including all possible combinations of batch, semi-batch, semi-continuous, or continuous mode. Accordingly, in various embodiments, the disclosed processes may be implemented using a combination of batch and continuous modes. In a non-limiting example of such a multi-mode process, one step of the process (e.g., pH adjustment of the aqueous fluid) may be carried out in batch mode, while one or more other steps (e.g., contacting aluminum with the pH-adjusted aqueous fluid) may be carried out in continuous mode. In certain embodiments, the ion removal process can be carried out in batch mode in a mixing chamber and in continuous mode through a reactor.

In some embodiments, it may be necessary to operate the system as a continuous flow system to be an economically viable ion removal process. In certain embodiments, this means treating the ion-containing aqueous fluid in a continuous mode with a flow rate equal to the user's production rate. However, controlling to stoichiometry under these conditions can be difficult because of the constantly changing shape and size of the aluminum as it undergoes oxidation at elevated pH to release aluminum ions into the aqueous fluid. In addition, a continuous flow process may require the ability to adjust to both changes in the flow rate of the aqueous fluid (i.e., the influent) and the concentration of ions targeted for removal. Thus, in various embodiments, to achieve the desired stoichiometry between calcium, sulfate and aluminate reagents, base-assisted oxidation of the aluminum surface to produce aluminum ions in the aqueous fluid may occur at a substantially constant rate. In various embodiments of such a continuous flow process, it may therefore be necessary to control the amount of dissolved metal in the reactor at all process times and may be necessary to be able to increase or decrease the available trivalent metal cations (e.g., $Al^{3+}$) in response to influent changes and targeted effluent concentrations. In accomplishing these objectives, control of the reaction under a wide range of continuous flow rates, where ions are removed from an aqueous fluid at a range or level acceptable to the user, can be achieved.

In some embodiments, a continuous flow ion-removal process may be carried out. Any of the aqueous fluids described herein may be suitable for use in such a process. In some embodiments, the one or more bases, such as lime, may be introduced into a mixing chamber containing the aqueous fluid to adjust the pH of the aqueous fluid. In such embodiments, the pH adjustment of the aqueous fluid may occur in the mixing chamber. In various embodiments, the base may be introduced as a solid, liquid, slurry, or any other suitable form. In embodiments where the one or more bases are added as a solid, the solid may be a powder, shavings, or larger format solid. Alternatively, in some embodiments, an aqueous fluid can be pH-adjusted with the one or more bases prior to entering the mixing chamber. In certain embodiments, the one or more bases may be introduced into the aqueous feed containing the ions to be removed. In certain embodiments, the one or more bases may be added in in batches. In other embodiments, the one or more bases may be added as a continuous operation. In various embodiments, the aqueous fluid contacting a metal (i.e., aluminum) may be pH-adjusted. In related embodiments, the pH adjustment may occur prior to the introduction of the aqueous feed containing the ions (i.e., oxyanions, such as sulfate) being removed. In some embodiments, the pH adjustment may be carried out in a mixing chamber (e.g., pre-treatment tank). In other embodiments, the pH adjustment may be carried out in a reactor.

In certain embodiments, a source of calcium ions necessary to drive the reaction to form one or more ettringites may be added to the aqueous fluid. In some embodiments, the source of calcium ions may be added to the mixing chamber. In various embodiments, the one or more bases that provides pH-adjustment also may be or comprise a source of calcium ions. In such embodiments, the one or more bases may comprise calcium hydroxide, slacked calcium oxide, lime, or any combination thereof. To provide as close to the stoichiometric ratio of $Ca^{2+}$ as possible, in some embodiments, titration of source of calcium ions (e.g., calcium hydroxide, slacked calcium oxide, lime) containing solution may be performed to determine what the solution demand for the source of calcium ions is. Based on this calculation the necessary lime or other suitable source of calcium ions may be added to the solution to be treated. In various embodiments, the source of calcium ions addition may be accomplished either volumetrically or gravimetrically. In some embodiments, the source of calcium ions addition may be carried out in a mixing chamber. In other embodiments, the source of calcium ions addition may be carried out in a reactor. In various embodiments, the source of calcium ions added may provide adequate calcium ion to form ettringite and enough unreacted hydroxide to maintain the selected pH in the reactor and thus the aluminum corrosion rate.

Process parameters can be monitored in any number of ways in order to maintain control of the desired stoichiometry. In various embodiments, said monitoring is by conductivity. In related embodiments, process parameters can be monitored and controlled by using pH and conductivity measurements as the control set points when used with proportional-integral-derivative (PID) logic controllers. In other embodiments, said monitoring is with an ion selective electrode. In still other embodiments, said monitoring is spectroscopic or turbidimetric. In related embodiments, the spectroscopic method is selected from atomic absorption (AA), inductively coupled plasma (ICP), inductively coupled plasma-ion emission spectroscopy (ICP-OES), inductively coupled plasma-mass spectrometry (ICP-MS), Raman, or infrared (IR). In still other embodiments, mass spectrometry is used to monitor and maintain control of the process.

One or more embodiments of the present disclosure may provide methods and systems for controlling the dissolution rate of metals such as aluminum (and thereby the process stoichiometry). In certain embodiments of the present disclosure, the methods and systems may comprise monitoring the incoming oxyanion (e.g., sulfate) concentration in the incoming aqueous fluids. In various embodiments of the present disclosure, the methods and systems may comprise calculating a stoichiometric amount of a base to be added to the aqueous fluid and adding said amount of base to the fluid. In some embodiments of the present disclosure, the methods and systems may comprise monitoring one or both of a conductivity value and a temperature value of the aqueous fluid in a mixing chamber. In some embodiments of the present disclosure, the methods and systems may comprise monitoring one or more of a conductivity value, a pH value, and a temperature value of the aqueous fluid in a reactor. In some embodiments of the present disclosure, the methods and systems may comprise maintaining an amount of aluminum metal present in the reactor based the flow rate of the aqueous fluid into the reactor. In some embodiments of the present disclosure, the methods and systems may comprise adding an amount of aluminum metal to the reactor based on a stoichiometric calculation using the concentration of incoming oxyanions and the flow rate of the aqueous fluid into the system. In some embodiments of the present disclosure, the methods and systems may comprise monitoring the rate of oxyanion removal in the reactor. In some embodiments of the present disclosure, the methods and systems may comprise adjusting the rate of oxyanion removal in the reactor. In some embodiments of the present disclosure, the methods and systems may comprise filtering the aqueous fluid after removal of the oxyanions. In some embodiments of the present disclosure, the methods and systems may comprise adjusting the pH of the aqueous fluid after removal of the oxyanions.

In certain embodiments, the aqueous fluid being treated may flow into a mixing chamber prior to entering the reactor. In other embodiments, the aqueous fluid being treated may flow directly into the reactor. The aqueous fluid being treated can be any aqueous fluid containing one or more anions suitable for incorporation into ettringite, for example one or more of water, groundwater, mine drainings, mine tailings, mine dumps, culm dumps, tails, slimes, refuses, leach residue, waste fluid from in situ mining, impregnated fluid from in situ mining, waste fluid from heap mining, impregnated fluid from heap mining, waste fluid from a nuclear facility, such as a nuclear power generation facility or nuclear testing facility, municipal waste water, gangue-containing aqueous fluid, waste water from smelting facilities, waste water from pulp and paper mills, waste water from textile mills, and waste water from tanneries. The aqueous fluid can comprise, in addition to water, one or more liquids other than water, for example, one or more alcohols, such as ethanol, methanol, propanol, isopropanol, etc., glycerol, glycerin, dioxins, acetone, oil, grease, wax, petroleum, kerosene, benzene, toluene, xylene, poly(alkylene oxides), such as liquid poly (ethylene oxide), dissolved poly(ethylene oxide), liquid poly (ethylene glycol), dissolved poly(ethylene glycol), liquid poly(propylene oxide), dissolved poly(propylene oxide), liquid copolymers of ethylene oxide and propylene oxide, and dissolved copolymers of ethylene oxide and propylene oxide, turpentine, liquid surfactants, dissolved surfactants, alkyl acetates, such as ethyl acetate and butyl acetate, methyl ethyl ketone, diethyl ether, tetrahydrofuran, dimethyl sulfoxide, dimethyl formamide, plasticizers, (alk)acrylates, such as poly((meth)acrylate), copolymers of poly((meth)acrylate), poly(methyl (meth)acrylate), and copolymers of one or more poly(methyl (meth)acrylate)s, carbon tetrachloride, and chloroform.

The one or more ions can be any ions, for example, ions that can precipitate as components of one or more ettringites. Such ions can include one or more of halide anions, oxyanions, alkali-earth metal cations, and transition metal cations. Thus, the one or more ions can be one or more of sulfate, chromate, carbonate, sulfite, magnesium, calcium, thiosulfite, selenate, selenite, molybdate, silicate, vanadate, arsenate, chloride, bromide, iodide, fluoride, nitrite, nitrate, manganate, borate, hypochlorite, chlorite, chlorate, perchlorate, iodite, iodate, bicarbonate, acetate, formate, cadmium, sulfamide, and hydroxide. In various embodiments, the ions being removed from an aqueous fluid are oxyanions. In some embodiments, the oxyanion is selected from the group consisting of chromate, selenate, selenite, borate, carbonate, sulfate, sulfite, thiosulfite, molybdate, silicate, vanadate, arsenate, nitrite, nitrate, manganate, iodite, iodate, formate, acetate, and priopionate. In specific embodiments, the oxyanions are sulfate ions. In other specific embodiments, sulfate ions are being removed an aqueous fluid, wherein the aqueous fluid is wastewater. In yet other specific embodiments, the wastewater is from mine tailings.

In certain embodiments, the methods and systems of the present disclosure comprise monitoring the amount of ions or oxyanions present in the aqueous fluid as it enters the mixing chamber or the reactor. In some embodiments, the monitoring may be conducted manually. For example, the monitoring may be performed by an operator or technician pulling a fluid sample to test in a lab. The tests performed may be using a spectrophotometer and associated test methods, such as those commercially available from Hach®. In other embodiments, the monitoring may be conduced automatically. For example, the monitoring may be performed by one or more sensors placed within the aqueous fluid. The one or more sensors may measure concentration of the oxyanion or conductivity. One example of such sensor is an automatic industrial process Raman analyzer.

The precise nature and concentration of the one or more ions can depend, in part, on how the source of the aqueous fluid. One source of aqueous fluid is in situ leaching or heap leaching, for example, in situ leaching or heap leaching of uranium ore. In an in situ leaching process, an aqueous extraction liquid is injected into uranium ore, for example with one or more mining injectors known in the art, without removing the ore from the ground. The extraction liquid can be acidified with added sulfuric acid or made alkaline with added carbonate, depending on the nature of the ore and surrounding rock. The acidic or alkaline extraction liquid can dissolve the uranium-containing components of the ore, impregnating the extraction liquid with dissolved uranium. The extraction liquid can then be removed from the ground, for example with one or more mining extractors known in the art. Heap leaching, sometimes known as heap mining, is similar to in situ leaching except that the uranium ore is removed from the ground and placed in a heap above ground before contacting the acidic or alkaline extraction liquid.

The remaining aqueous fluid can have a high concentration of oxyanions, such as one or more of sulfate and carbonate. For example, when an acidic extraction liquid is used, the aqueous fluid can have a sulfate ion concentration of about 100 mg/L or more, or from about 100 mg/L to about 2,000 mg/L. Similarly, when an alkaline extraction liquid is used, the aqueous fluid can have a carbonate ion concentration of about 100 mg/L or more, or from about 100 mg/L to about 2,000 mg/L. In other cases, such as when an alkaline extraction liquid is used in conjunction with a sulfate-containing ore, the aqueous fluid can have a concentration of both sulfate and carbonate that are, for example, about 100 mg/L or more, or from about 100 mg/L to about 2,000 mg/L.

The concentration of ions in an aqueous fluid can vary by source and/or application. In some embodiments, the concentration of oxyanion (e.g., sulfate) in the aqueous fluid ranges from less than about 1.0 μ/L to the maximum saturation that a specific aqueous fluid will allow. In some embodiments, the oxyanion concentration in the aqueous fluid ranges from about 1 μ/L to about 12,000 mg/L, including all ranges and values therebetween. In some embodiments, the oxyanion concentration in the aqueous fluid ranges from about 1 μ/L to about 1,000 μ/L, including all ranges and values therebetween. In some embodiments, the oxyanion concentration in the aqueous fluid ranges from about 1 mg/L to about 1,000 mg/L, including all ranges and values therebetween. In some embodiments, the oxyanion concentration in the aqueous fluid ranges from about 1 mg/L to about 8,000 mg/L, including all ranges and values therebetween. In some embodiments, the oxyanion concentration in the aqueous fluid ranges from about 1 g/L to about 20 g/L, including all ranges and values therebetween.

From a known concentration of sulfate in the aqueous fluid, the stoichiometric amount of base required by the ettringite-forming reaction can be calculated. This may be necessary so that the ion removal process may occur as close to the stoichiometry of the ettringite being formed as possible (i.e., without excess base and aluminum ions). Thus, in some embodiments of the present disclosure, the aluminum ions, calcium ions, hydroxide ions, and the ions being removed from the aqueous fluid (e.g., oxyanions such as sulfate) are present in solution in a molar ratio that is substantially the same as the molar ratio of said ions in the precipitated ettringite. The amount of base added is therefore calculated based on the amount of sulfate or other ions being removed. In some embodiments, a titration of calcium oxide containing solution is performed to determine what the solution demand for calcium hydroxide is. In related embodiments, the calculated amount of lime or other suitable base is added to the aqueous fluid volumetrically or gravimetrically. In various embodiments, lime or other suitable base is added in an amount that provides sufficient calcium to form ettringite and provide enough unreacted hydroxide to maintain the selected pH in the reactor and thus the aluminum corrosion rate. The amount of calcium hydroxide in solution can be measured by the hydroxide ion concentration in solution and is measured as pH or pOH. The higher the pH or lower the pOH the faster the reaction. The lower the pH or the higher the pOH the slower the reaction. The pH of the solution should be kept above pH of 10 or lower than 3.5 pOH, to ensure that the anion substituted calcium aluminates precipitate forming ettringite. The pH of the solution may be between about 10 and about 13. The pH of the solution can be regulated to maintain a substantially constant reactor pH by well-known gravimetric or volumetric additions of the hydroxide containing salt.

As discussed above, in certain embodiments the aqueous fluid may flow into a mixing chamber (e.g., pre-treatment tank) prior to being fed to the reactor. The mixing chamber may be any vessel suitable for holding the aqueous fluid. In certain embodiments, the methods and systems of the present disclosure may comprise monitoring one or both of a conductivity value and a temperature value of the aqueous fluid in the mixing chamber. In some embodiments, the conductivity value of the aqueous fluid in the mixing chamber and elsewhere in the systems of the present disclosure may be measured using a conductivity probe or sensor, such as a Memosens CLS82D conductivity sensor commercially available from Endress+Hauser. In some embodiments, the temperature value of the aqueous fluid in the mixing chamber and elsewhere in the systems of the present disclosure may be measured using a thermocouple or temperature sensor. In certain embodiments, the conductivity probe or sensor also may be capable of measuring temperature.

In certain embodiments, the aqueous fluid may flow from the mixing chamber to one or more reactors. In other embodiments, the aqueous fluid may be fed directly to one or more reactors without the use of a mixing chamber. In various embodiments, once the aqueous fluid is in the reactor, one or more properties of the aqueous fluid may be monitored. For example, in some embodiments, the methods and systems of the present disclosure may comprise monitoring one or more of a conductivity value, a pH value, and a temperature value of the aqueous fluid in the reactor. In certain embodiments, the one or more properties may be monitored using one or more automatic sensors. In other embodiments, the one or more properties may be monitored using one or more manual tests. In some embodiments, the pH value may be measured using a pH sensor or meter, such as a Memosens CPS171D pH sensor commercially available from Endress+Hauser. In certain embodiments, the pH sensor or meter also may be capable of measuring temperature.

In various embodiments, the ion removal process can be controlled by setting and maintaining a substantially constant conductivity. The conductivity level can be based on a selected user input setting. After the reactor chemistry is set and the desired anion removal rate is achieved, the conductivity in the reactor is measured. In various embodiments, the conductivity in the reactor will be substantially constant at specific anion removal rates because an equilibrium is set up between dissolved species and precipitated solids. In some embodiments, when the reactor has been adjusted to the desired flow, pH, aluminum oxidation rate, and anion removal, the conductivity measured under these conditions can be used to hold the established reactor conditions substantially constant. The flow rate, aluminum addition, and lime addition can then be modulated (i.e., fluctuate) to maintain the desired conductivity. In certain embodiments, a PID control loop is used to achieve this outcome. Exit or reactor anion concentration is then monitored to determine if a change is required. In some embodiments, increasing the conductivity set point increases flow, increases anion addition, increases pH, and decreases reaction time. In other embodiments, decreasing the conductivity set point decreases flow, reduces the anion addition, decreases pH, and increase reaction time. In still other embodiments, aluminum metal addition will also decrease conductivity due to the excess aluminum surface area available and the subsequent increase in hydroxide demand.

In various embodiments, the disclosed process utilizes a relationship between the desired amount of anions (sulfate) to be removed and conductivity of the reactor solution when this removal target amount is reached. This data is used to make changes to the corrosion rate of the metal mass in the reactor to increase or decrease the available trivalent metal ions. These changes include adjusting the quantity of metal being added to make up for oxidation loss and adjusting the agitation forces applied to mix the contents of the reactor. In certain embodiments, the percentage of ions removed from the aqueous fluid by the time the aqueous fluid exits the reactor may be from about 5% to about 100%, including all ranges and values therebetween. In certain embodiments, the percentage of ions removed from the aqueous fluid by the time the aqueous fluid exits the reactor may be from about 50% to about 100%, including all ranges and values therebetween. In certain embodiments, the percentage of ions removed from the aqueous fluid by the time the aqueous fluid exits the reactor may be from about 75% to about 100%, including all ranges and values therebetween. In certain embodiments, the percentage of ions removed from the aqueous fluid by the time the aqueous fluid exits the reactor may be from about 90% to about 100%, including all ranges and values therebetween. In certain embodiments, the percentage of ions removed from the aqueous fluid by the time the aqueous fluid exits the reactor may be from about 75% to about 99%, including all ranges and values therebetween.

In various embodiments, the efficient formation of ettringites occurs when the pH is greater than about 10. Accordingly, in some embodiments the pH of the aqueous fluid being treated is increased by the addition of base. Once the desired pH level has been established, in some embodiments, the pH-adjusted aqueous fluid is maintained at a substantially constant pH for the duration of the ion-removal process. At a substantially constant pH, the metal ion release-rate can be controlled by adjusting the abrading forces. In some embodiments, when the pH is held substantially constant, a substantially constant metal ion release-rate is maintained by adjusting the abrading forces applied to the metal. As noted herein, abrading forces can be used to dislodge precipitates from the metal to create reactive areas. Therefore, in some embodiments, the substantially constant aluminum release rate is controlled by the amount of reactive aluminum surface area contacted by the pH-adjusted aqueous fluid. In various embodiments, the aluminum corrosion rate, calcium ion concentration, and hydroxide ion concentration in the aqueous fluid are substantially constant at a substantially constant pH. In some embodiments, the pH is about 10 or greater. In some embodiments, the pH is about 11 or greater. In other embodiments, the pH of the aqueous fluid is maintained from about 10 to about 12. In certain embodiments, the pH of the aqueous fluid is maintained in a range from about 11 to about 12. In certain embodiments, the pH of the aqueous fluid is maintained in a range from about 12 to about 13.

Increasing the pH of the aqueous fluid can be accomplished by any suitable method. For example, the pH can be increased by contacting the aqueous fluid with one or more bases. When increasing the pH comprises contacting aqueous fluid with one or more bases, the one or more bases can be, for example, one or more of solid base, a basic solution, and a basic suspension. The one or more bases can comprise one or more alkali metal or alkaline earth hydroxide salts or oxides, for example, one or more of sodium hydroxide, sodium oxide potassium hydroxide, potassium oxide calcium hydroxide, calcium oxide, as well as ammonium hydroxide, and metallic hydroxides or oxides such as magnesium hydroxide and magnesium oxide. Solutions and suspensions containing one or more of the above-mentioned hydroxide salts, or solutions and suspensions of metal oxides can also be used. The base can be in the form of a raw material, such as lime or lye, for example, solutions or suspensions of one or more of lime and lye, such as hydrated lime.

In various embodiments, increasing the pH of the aqueous fluid is carried out by contacting the aqueous fluid with one or more bases. In some embodiments, the base comprises one or more of sodium hydroxide, potassium hydroxide, calcium hydroxide, ammonium hydroxide, magnesium hydroxide, or combinations thereof. In some embodiments, the base slaked calcium oxide or calcium hydroxide. In specific embodiments, the base is calcium hydroxide. Thus, in various embodiments, the aqueous fluid further comprises calcium ions.

The methods and systems of the present disclosure may comprise adding a metal to the reactor to create one or more ettringites. In various embodiments, the metal may be any suitable trivalent metal. In some embodiments, the metal may be an aluminum metal. In some embodiments, the aluminum metal can comprise any type of aluminum metal material, for example, one or more of aluminum scrap, aluminum pellets, aluminum shot, recycled aluminum-based household products, such as aluminum containing cans, tins, and foils, aluminum flakes, and aluminum turnings. In various embodiments, the aluminum metal and aluminum metal material need not be pure aluminum, but may include aluminum mixed with other materials such as one or more aluminum oxides. Accordingly, in various embodiments, the aluminum metal is an aluminum metal alloy. In specific embodiments of the present disclosure, the aluminum metal is aluminum scrap. In some embodiments, the aluminum metal can be pre-loaded into the reactor chamber before the addition of the aqueous fluid to the reactor chamber, added to the reactor chamber after the addition of the aqueous fluid, or partially pre-loaded and partially added to the reactor chamber after the addition of the aqueous fluid. As will occur to those skilled in the pertinent art and having the benefit of this disclosure, the amount of aluminum metal added to the reactor may depend upon, among other things, the flow rate of the aqueous fluid, the surface area of the aluminum metal, and/or the amount of ions being removed from the aqueous fluid. As will occur to those skilled in the pertinent art and having the benefit of this disclosure, the surface area of the aluminum metal may depend upon, among other things, the size and shape of the aluminum metal. In certain embodiments, the surface area of the aluminum metal in the reactor may be from about 1 $cm^2$ to about 100 $cm^2$ per milligram (mg) of the ions being removed per minute. In certain embodiments, the surface area of the aluminum metal in the reactor may be from about 1 $cm^2$ to about 50 $cm^2$ per milligram (mg) of the ions being removed per minute. In certain embodiments, the surface area of the aluminum metal in the reactor may be from about 1 $cm^2$ to about 20 $cm^2$ per milligram (mg) of the ions being removed from the aqueous fluid per minute.

In various embodiments, adequate control of the process requires maintaining a substantially constant rate of metal (e.g., aluminum) oxidation by the one or more bases used to increase the pH of the aqueous fluid. In various embodiments, controlling the metal ion release-rate results in the release of stoichiometric amounts of aluminum metal ions that react with calcium ions and sulfate to produce ettringites. The ettringites may form as a solid precipitate from the treated aqueous fluid and can be removed as part of the ion removal process. As the process continues in the reactor, the aluminum metal surface area is constantly being reduced while, in some embodiments, the oxyanion concentration, lime feed rate and treatment flow remain substantially constant. Thus, in one or more embodiments, aluminum metal may be added to replace the aluminum in the precipitated ettringites.

As discussed above, the flow of aqueous fluid into the reactor and the amount of oxyanions in the aqueous fluid may be monitored. In certain embodiments, the amount of metal added to the reactor may be calculated based on one or more of the flow rate of the aqueous fluid and the amount of oxyanions in the aqueous fluid. In various embodiments the metal may be added to the reactor in a batch process. In other embodiments, the metal may be added to the reactor in a continuous process. In some embodiments, the metal may be added to the reactor manually. In other embodiments, the metal addition may be process automated.

As discussed above, the process covered by the methods and systems of the present disclosure may operate in continuous or batch mode. In batch mode, a defined amount of aqueous fluid containing ions to be removed (e.g., oxyanions which can precipitate as a component of one or more ettringites) is treated by addition of base, to increase the pH. The pH-adjusted aqueous medium may then be contacted with aluminum metal to form an ettringite precipitate. The ettringite precipitate can then be recovered by one or more processes such as floatation, filtration, decantation, centrifugation, etc. In continuous mode, a substantially constant flow of aqueous liquid can be treated continuously, as described herein.

In certain embodiments, aluminum ions can be released in a mixing chamber or reactor prior to the introduction of the ions targeted for removal. In various embodiments, aluminum metal may be contacted by a solution of base, prior to the introduction of oxyanions. In some embodiments, the dissolved aluminum ions are transferred via flow or other suitable method to a reactor holding the oxyanion-containing aqueous fluid to be treated. In other embodiments, an aqueous fluid comprising oxyanions can be introduced directly into the tank or vessel with the dissolved aluminum ions. In either case, the resulting precipitated ettringites can be removed as described herein.

In various embodiments, the pH-adjusted aqueous fluid can be transferred via flow from the mixing chamber into a reactor or other suitable vessel containing aluminum, for which a corrosion rate has been determined. In various embodiments, contacting the metal with the one or more bases occurs in the reactor. In some embodiments, the flow rate of the aqueous fluid is set to match the aluminum conversion rate as closely as possible, so that a stoichiometric balance of ions is achieved. In some embodiments, the rate of flow of the pH-adjusted aqueous fluid is from about 1.0 mL/min to about 500,000 L/min, including all ranges and values therebetween. In other embodiments, the rate of flow of the pH-adjusted aqueous fluid is from about 100 gallons per min (gpm) to about 80,000 gallons per minute, including all ranges and values therebetween. In yet other embodiments, the rate of flow is from about 100 gallons per minute to about 1,000 gallons per minute, including all ranges and values therebetween. In still other embodiments, the rate of flow is from about 1,000 gallons per minute to about 80,000 gallons per minute. In certain embodiments, the rate of flow is from 100 gallons per minute to about 80,000 gallons per minute. In other embodiments, the rate of flow of the pH-adjusted aqueous fluid is from about 100 gallons per min (gpm) to about 10,000 gallons per minute, including all ranges and values therebetween. As will occur to those skilled in the pertinent art and having the benefit of this disclosure, the rate of flow may be any amount and is dependent upon, among other things, the volume of the equipment in the system (e.g., mixing chamber, reactor) of the present disclosure.

In various embodiments, the flow of the aqueous fluid into the reactor is maintained at a substantially constant rate. In some embodiments, the aqueous fluid is maintained at a substantially constant flow rate and has an oxyanion concentration that remains relatively unchanged. In various embodiments, when the oxyanion concentration in the influent flow to a reactor is substantially constant, stoichiometric control of the reaction can be affected by varying agitation of the aluminum metal (i.e., to compensate for changes in aluminum surface area and/or surface passivation) to provide a substantially constant aluminum corrosion rate that matches the ion (e.g., sulfate) concentration.

In embodiments where the flow of the aqueous fluid into the reactor is maintained at a substantially constant rate, the rate of oxyanion removal may be monitored using any suitable method. For example, in certain embodiments, the rate of oxyanion removal may be monitored by measuring the conductivity within the reactor. In other embodiments, the rate of oxyanion removal may be measured by monitoring the conductivity of the fluid leaving the reactor. In still other embodiments, the rate of oxyanion removal may be measured by monitoring the conductivity of the fluid leaving the reactor and comparing it to the conductivity of the fluid entering the reactor or mixing chamber. In some embodiments, the rate of oxyanion removal may be monitored by measuring the pH of the aqueous fluid within the reactor. In various embodiments, the rate of oxyanion removal may be monitored by directly measuring the amount of oxyanions present in the aqueous fluid exiting the reactor.

In various embodiments, the flow rate of the aqueous fluid into a reactor is variable. Under these conditions, the ion removal process can be controlled by setting and maintaining a substantially constant pH. The desired pH can be based on a user input setting. In some embodiments, the flow rate can be adjusted to maintain pH based on the amount of calcium hydroxide added to the incoming treatment stream. Accordingly, in related embodiments, at a specific pH value the corrosion rate, calcium ion and hydroxyl ion in the feed solution are fixed. As ions react with aluminum ions in the aqueous fluid to precipitate ettringites, the surface area of the aluminum metal in the reactor decreases and because there is less hydroxide needed to corrode the aluminum, the pH of the reactor solution increases. Thus, in various embodiments, to maintain a substantially constant pH in the reactor and thus a substantially constant anion removal rate, aluminum is added/subtracted to create additional or lesser surface area and additional or less hydroxide demand. In related embodiments, as aluminum metal is added, the flow rate will compensate for any over feed or underfeed of aluminum by increasing or decreasing flow. In some embodiments, a PID control loop is used to achieve a substantially constant pH and trigger treatment changes and alarms. In related embodiments, exit reactor chemistry is monitored and adjustments made to the system based on operational goals. Consequently, in various embodiments, the aluminum corrosion rate (i.e., the release of aluminum ions) is controlled to a substantially constant rate (e.g., by varying agitation of the aluminum metal to compensate for changes in surface area and/or surface passivation) while varying the influent flow as needed to match oxyanion concentration to the aluminum corrosion rate.

In various embodiments of the processes disclosed herein, the metal ions released are aluminum ions. As noted above, precipitates can form on a metal surface that prevent or inhibit reactivity. In various embodiments of the present disclosure, the precipitates are disposed on a metal surface. In other embodiments, the precipitates are oxidation products disposed on the metal surface. In certain embodiments, the precipitates result from passivation of the metal surface. In other embodiments, deposits can form on a metal surface that prevent or inhibit reactivity. In various embodiments, the deposits are disposed on a metal surface. In certain embodiments, the deposits are debris, oils, or coatings. In specific embodiments, the metal surface is an aluminum metal surface.

The quantity of aluminum metal in the reactor regulates the surface area of aluminum exposed to oxidation. The larger the surface area the faster the reaction, the lower the surface area the slower the reaction. Since this is a surface reaction, the reactive surface area is determined by the ratio of free aluminum to passivated (oxide-covered) aluminum on the surface on the metal. The initial reactive surface of the aluminum metal is quickly passivated to form an oxide layer on the aluminum metal surface by the reaction $2Al+6H_2O=2Al(OH)_3+3H_2$. As the release (e.g., dissolution) rate of a metal, such as aluminum, depends significantly on the amount of reactive surface area available, the passivation layer should be continually removed in order to maintain a substantially constant rate of aluminum ion release.

In various embodiments of the present disclosure, a substantially constant metal corrosion rate (i.e., metal ion release) is established when a substantially constant metal surface area is exposed. In some embodiments, this affords a stoichiometric or near-stoichiometric release of metal ions into the aqueous fluid. In certain embodiments, the presence of a stoichiometric amount of solubilized aluminum ions relative to the ions (e.g., sulfate ions) being removed from the pH-adjusted aqueous fluid is maintained by adjusting the dissolution rate of the aluminum metal being contacted by the pH-adjusted aqueous fluid. By maintaining a stoichiometric balance between the ionic components in the aqueous fluid, an economically viable process can be achieved.

In various embodiments, increasing or decreasing the rate of metal ion (e.g., aluminum) release is in response to a change in the concentration of anions (e.g., oxyanions such as sulfate, chromate, borate concentration, etc.) in the aqueous fluid. In some embodiments, the metal ion release-rate is increased in response to an increase in the concentration of anions in the aqueous fluid. In other embodiments, the metal ion release-rate is decreased in response to a decrease in the concentration of anions in the aqueous fluid. In certain embodiments, the metal ions being released are trivalent metal ions and the anions being removed from the aqueous fluid are oxyanions. In more specific embodiments, the metal ions being released are trivalent aluminum ions and the anions being removed from the aqueous fluid are sulfate ions. Regardless of whether the anion concentration in the aqueous fluid increases or decreases, the process as described herein provides a method for maintaining a stoichiometric balance between metal ions released from a metal surface and oxyanions to be removed from the aqueous fluid. In related embodiments, increasing or decreasing the rate of metal ion release is in response to changes in the flow rate of aqueous fluid. In certain embodiments, the rate of metal ion release is from about 0.15 mg/min to about 6 mg/min per mg of the ions being removed. In certain embodiments, the rate of metal ion release is from about 0.18 mg/min to about 1 mg/min per mg of the ions being removed. In certain embodiments, the rate of metal ion release is from about 0.18 mg/min to about 0.5 mg/min per mg of the ions being removed from the aqueous fluid.

In certain embodiments of the present disclosure, the metal surface may be agitated to control the release rate of metal ions from the metal surface. For example, it has surprisingly been found that the application of abrading forces to a metal surface (i.e., an aluminum metal surface) can be used to control the release-rate of metal ions. In various embodiments, agitating metal pieces of sufficient size and mass provides a mechanical abrading force on the surface of the metal that releases the oxidation products (e.g., a passivation layer) from the surface of the metal and exposes new reactive sites. The exposed metal surface area can be contacted with a concentration of base (i.e., hydroxide), which subsequently results in the release of metal ions into the aqueous fluid. In some embodiments, by varying the degree of agitation, the rate of metal ion release can be controlled to remain substantially constant (e.g., by maintaining a substantially constant amount of reactive surface area, or by increasing the activity of the surface as the surface area of the metal decreases during dissolution, or some combination thereof). In other embodiments of the present disclosure, the rate of metal ion release can be varied up or down, e.g. by increasing or decreasing agitation, and thereby the abrading forces applied to the metal surface.

Accordingly, in various embodiments, abrading forces (e.g., by means of agitating the metal in the reaction) are applied to a metal surface. In certain embodiments, the application of abrading forces dislodges precipitates from a metal surface. In related embodiments, the dislodging of the precipitates provides a reactive surface area on the aluminum metal. In specific embodiments, the metal surface is an aluminum metal surface.

When precipitates, such as those from a passivation layer, are dislodged from the metal surface by abrading forces, reactive surface area is exposed. Contacting the reactive surface with base, for example, releases metal ions into solution. Therefore, by modulating the amount of abrading forces applied to the metal surface, the metal ion release-rate can be controlled at a given pH. Consequently, in various embodiments, to control the metal ion release-rate, the abrading forces can be increased and/or decreased. In some embodiments, the abrading forces are increased. In other embodiments, the abrading forces are decreased. In various embodiments, increasing the abrading forces increases the rate of aluminum ion release. In some embodiments, the abrading forces are increased to maintain a substantially constant overall rate of aluminum ion release. In related embodiments, increasing the abrading forces in this manner may be necessary as ettringite forms and thereby decreases the amount of available reactive aluminum in the reactor. In some embodiments, decreasing the abrading forces decreases the rate of aluminum ion release. In other embodiments, the abrading forces are decreased to maintain a substantially constant overall rate of aluminum ion release. In related embodiments, decreasing the abrading forces to maintain a substantially constant over rate of aluminum ion release may be necessary after aluminum is added to a reactor to replace aluminum consumed by the ettringite reaction.

A reactor or other suitable vessel can be fitted with an agitation device which can be used to agitate the aqueous fluid and provide abrading forces. In some embodiments, the agitation device may be a mixing element. Without being bound by theory, changes to the speed of the agitation device has surprisingly been found to either increase the corrosion rate of the metal by abrading the metal surface to expose reaction sites, or decrease the corrosion rate by allowing a passivated layer on the metal surface to persist. In various embodiments, the abrading forces are increased by increasing the amount of mixing in the reactor. In other embodiments, the abrading forces are decreased by decreasing the amount of mixing in the reactor. Accordingly, the rate of metal ion release (i.e., the rate of dissolution) in the reactor can be controlled by changing the amount of abrading forces, wherein the abrading forces are supplied by the agitation device.

In certain embodiments, the abrading force may be applied using an agitation device. In some embodiments, the agitation device may be one or more mixers. For example, in one or more embodiments of the present disclosure, abrading forces may be applied to a metal by contacting the metal, in particular the metal surface, with one or more mixing elements. In certain embodiments, the one or more mixing elements comprises one or more of paddle mixers, impellers, turbine mixers, vortex mixers, agitators, drum mixers, cement-type mixers, augers, and other types of suitable stirrers. In various embodiments, the abrading forces are correlated with the mixer speed. The mixer speed can be quantified in revolutions per minute (rpms), where faster mixing equates to an increase in the abrading forces applied to the metal surface. In certain embodiments, the mixer speed is from about 1 rpm to about 1,000 rpm. In some embodiments, the mixer can be operated in a range of about 45% to about 100% of the maximum motor speed of said mixer. In related embodiments, the maximum mixer speed is the speed at which no aluminum or essentially no aluminum is expelled from the reactor during the ion removal process. In certain embodiments, maximum mixer speed is the speed at which no aluminum is expelled from the reactor during the ion removal process. In addition to rate, the extent of mixing also depends on blade size, paddle size, impeller size, or the like. Therefore, in some embodiments, the degree of mixing is increased by increasing the mixer speed and/or the size of the blade, paddle, or impeller. In other embodiments, the degree of mixing is decreased by decreasing the mixer speed and/or the size of the blade, paddle, or impeller. The precise control of the metal corrosion rate in this unexpected manner by the application of abrading forces allows the process to be carried out with a stoichiometric balance of ions that avoids adding excess aluminum ions or undertreating the aqueous fluid. As a result, an economically optimized process for ion removal is achieved.

In various embodiments, the agitation device may also be an ultrasonic device. In such embodiments, the ultrasonic device may generate ultrasonic waves in the aqueous fluid the create microbubbles that implode at the surface of the aluminum metal, which may dislodge or otherwise remove the adhering oxide layer (e.g., precipitate) and/or other inactivating layers from the surface of the aluminum metal. In some embodiments, the agitation device may be a tumbler or tumbling device. In such embodiments, the tumbler or tumbling device containing the aluminum metal may tumble or vibrate such that the pieces of aluminum metal are forced into one another (or a non-reactive media (e.g., ceramic)) so as to dislodge or otherwise remove the adhering oxide layer (e.g., precipitate) and/or other inactivating layers from the surface of the aluminum metal. In one or more embodiments, the agitation device may be an auger type screw. In such embodiments, the auger type screw may be run through the aluminum metal such that the pieces of aluminum metal are forced into one another (or a non-reactive media (e.g., ceramic)) so as to dislodge or otherwise remove the adhering oxide layer (e.g., precipitate) and/or other inactivating layers from the surface of the aluminum metal. In other embodiments, the agitation device may be a vibrator or vibratory device. In such embodiments, the vibrator or vibratory device containing the aluminum metal may vibrate such that the pieces of aluminum metal are forced into one another (or a non-reactive media (e.g., ceramic)) so as to dislodge or otherwise remove the adhering oxide layer (e.g., precipitate) and/or other inactivating layers from the surface of the aluminum metal. In other embodiments, the agitation device may be a grinding device or grinder. In such embodiments, the grinding device or grinder having a non-reactive abrasive surface may contact the aluminum metal and grind off or otherwise remove the adhering oxide layer (e.g., precipitate) and/or other inactivating layers from the surface of the aluminum metal. In still other embodiments, agitation device may be a pump designed to move the aluminum metal using a flow of process water or other fluid. In still other embodiments, agitation device may be a pump designed to move the aluminum metal such that the pieces of aluminum metal are forced into one another so as to dislodge or otherwise remove the adhering oxide layer (e.g., precipitate) and/or other inactivating layers from the surface of the aluminum metal.

In other embodiments, one or more inert materials can be added to the one or more reactor chambers to abrade the surface of the aluminum metal and remove some or all of the coating. The one or more inert materials can also provide nucleation sites for forming the one or more precipitates. The one or more inert materials can be in any suitable form, such as chips, flakes, pellets, and spheres, and may comprise any suitable material, such as one or more of carbon, for example glassy carbon, glass ceramic, for example, low silicon alumina ceramic, and plastic, such as poly(tetrafluoroethylene) plastic.

In certain embodiments, the oxyanion removal process may be sensitive to pH. In various embodiments, increasing and/or decreasing the operating pH impacts the rate of ettringite formation in the aqueous fluid. In some embodiments, increasing the pH results in a faster metal corrosion rate. Consequently, as the metal corrosion rate increases, the rate of ettringite formation increases. In other embodiments, decreasing the pH results in a slower metal corrosion rate, thereby leading to a slower formation of ettringite. In such cases, a larger quantity of metal (e.g., aluminum in a reactor) can be required to reach an appropriate flow rate. In various embodiments, the ion-removal processes disclosed herein can be carried out at pH ranging from about 10 to about 13, including all ranges and values therebetween. In various embodiments, the ion-removal processes disclosed herein can be carried out at pH ranging from about 11 to about 12.3, including all ranges and values therebetween. It has been discovered that increasing the pH of the aqueous fluid results in a faster metal corrosion rate, but once the pH reaches about 12.3 the metal corrosion rate begins to decrease.

In certain embodiments, the oxyanion removal process may be sensitive to temperature. In various embodiments, increasing and/or decreasing the operating temperature impacts the rate of ettringite formation in the aqueous fluid. In some embodiments, increasing the temperature results in a faster metal corrosion rate. Consequently, as the metal corrosion rate increases, the rate of ettringite formation increases. In other embodiments, decreasing the temperature results in a slower metal corrosion rate, thereby leading to a slower formation of ettringite. In such cases, a larger quantity of metal (e.g., aluminum in a reactor) can be required to reach an appropriate flow rate. In various embodiments, the ion-removal processes disclosed herein can be carried out at temperatures ranging from about 0° C. to about 100° C., including all ranges and values therebetween. In various embodiments, the ion-removal processes disclosed herein can be carried out at temperatures ranging from about 5° C. to about 50° C., including all ranges and values therebetween. In addition, temperature fluctuations naturally occur depending on environmental conditions. The ion removal process may be operating at different times of day and/or during different seasons, thus varying the temperature at which the aqueous fluid is being treated.

The one or more precipitates can be separated from the aqueous fluid. Separation of the one or more precipitates from the aqueous fluid can be accomplished by any means, for example, one or more of flotation, filtration, centrifuging, and settling. When flotation is used, it can comprise dissolved air flotation, among other flotation techniques. Filtration can be accomplished with any suitable filtration device, for example, one or more of sand filters, canister filters, cartridge filters, and belt filters. Belt filters are commonly used in the mining industry but are not required unless otherwise specified. Settling can comprise any one or more settling techniques, for example, one or more of adding one or more upflow clarifiers, settling with one or more tube settlers, settling with one or more plate settlers, adding one or more thickeners, such as thickening polymers like acrylamide polymers and copolymers, and adding one or more rigidifying materials. Centrifuging can be accomplished with any one or more centrifuges, for example one or more of fixed angle centrifuges, swinging head centrifuges, continuous tubular centrifuges, ultracentrifuges, screen centrifuges, screen-roll centrifuges, pusher centrifuges, peeler centrifuges, decanter centrifuges, and continuous liquid centrifuges, such as solid bowl centrifuges and liquid plate centrifuges. Centrifuging can produce a cake of the one or more precipitates, for example, one or more ettringites, and a liquid concentrate. In certain embodiments, the precipitates may be separated using a filter press. In other embodiments, the precipitates may be separated using a micro-filtration process. In still other embodiments, the precipitates may be separated using gravity filtration.

After separation of the one or more precipitates, the pH of the remaining aqueous fluid can be adjusted, for example, to from about 6 to about 8. Adjusting the pH of the remaining aqueous fluid can be accomplished by any method, for example, by one or more of contacting the remaining aqueous fluid with one or more acids and contacting the remaining aqueous fluid with carbon dioxide. When adjusting the pH comprises contacting the remaining aqueous fluid with carbon dioxide, the carbon dioxide can be a solid or a gas. When carbon dioxide is used, the volume of the remaining aqueous fluid can increase by only a trivial amount, thus minimizing the additional volume of aqueous fluid for disposal. In various embodiments, the amount of carbon dioxide added to the aqueous fluid may be from about 1 mg/L of the aqueous fluid to about 500 mg/L of the aqueous fluid, including all ranges and values therebetween. In various embodiments, the amount of carbon dioxide added to the aqueous fluid may be from about 5 mg/L of the aqueous fluid to about 300 mg/L of the aqueous fluid, including all ranges and values therebetween.

After pH-adjustment, the remaining aqueous fluid can be discharged to any suitable location. The suitable location will depend on the contents of the remaining aqueous fluid, the applicable regulations governing discharge of aqueous fluids, and the intended use of the remaining aqueous fluid. For example, the remaining aqueous fluid can be discharged to a suitable aquifer, for example, by using one or more mining injectors such as those discussed above with respect to in situ leaching. If appropriate, the remaining aqueous fluid can be discharged into a water system, such as a municipal waste water or drinking water system. As another example, if the remaining aqueous fluid is considered dangerous, for example, because it has unacceptably high radioactivity levels, then it can be discharged directly to an appropriate storage or decontamination facility or to appropriate containers for later transportation to an appropriate storage or decontamination facility.

FIG. 1 schematic representation of one embodiment of an ion removal system 100 in accordance with certain embodiments of the present disclosure. In system 100, an aqueous fluid containing one or more oxyanions is added to a mixing chamber 102. One or more pumps 104 may be used to add the aqueous fluid to mixing chamber 102. A source of calcium ions and/or a base may be stored in a tank 106. Although a single tank is shown at tank 106, separate tanks could be used for the source of calcium ions and the base. The source of calcium ions and/or the base may be added to mixing chamber 102 from tank 106 to, for example, increase the pH of the aqueous fluid. Mixing chamber 102 may contain a mixing element 108 that mixes the source of calcium ions and/or base into the aqueous fluid. Mixing element 108 may be one or more of paddle mixers, impellers, such as mixed flow impellers, turbine mixers, such as curved blade turbines, and radial blade turbines, vortex mixers, agitators, such as gear driven agitators, drum mixers, and stirrers.

A first measurement device 110 may be located upstream of mixing chamber 102. First measurement device 110 may measure one or more properties of the aqueous fluid prior to entering mixing chamber 102, including, for example, the amount of oxyanions in the aqueous fluid, the conductivity of the aqueous fluid, and the temperature of the aqueous fluid. Although it is shown as a single device, first measurement device 110 may include one or more measurement devices. For example, one measurement device may be used to measure the amount of oxyanions in the aqueous fluid, and a separate measurement device may be used to measure the temperature of the aqueous fluid. First measurement device 110 and other measurement devices in system 100 may take measurements continuously or at one or more predetermined time interval (e.g., every minute). First measurement device 110 may send the measurements to a control system 112 via signal path 118.

A second measurement device 120 may be operative coupled to mixing chamber 102 to measure one or more properties of the aqueous fluid inside mixing chamber 102, including, for example, the pH, the conductivity, and/or the temperature of the aqueous fluid. As with first measurement device 110, second measurement device 120 may include one or more measurement devices. Second measurement device 120 sends the measurements to control system 112 via signal path 122.

Control system 112 may include a logic controller, such as a PID controller. Control system 112 compares a measurement from first measurement device 110 and/or second measurement device 120 to one or more setpoints programmed within control system 112. Based on the comparison of the measurement to the setpoint, control system 112 generates an output signal and sends the output signal to one or more components of the system 100, for example pump 104 via signal path 114 or tank 106 via signal path 116. The output signal may cause the component of the system 100 that receives the output signal to make an adjustment. For example, in the case of pump 104, the output signal from control system 112 via signal path 114 may adjust (e.g., increase or decrease) the speed of pump 104. In the case of tank 106, the output signal from control system 112 via signal path 116 may adjust (e.g., increase or decrease) the amount of the source of calcium ions and/or the base that is added to mixing chamber 102 from tank 106, which may in turn change the pH of the aqueous fluid and/or the amount of calcium ions in the aqueous fluid that are available to form one or more ettringites.

The aqueous fluid is transferred from mixing chamber 102 to reactor 124 that may contain an agitation device 126. Agitation device 126 may be a paddle mixer, turbine mixer, vortex mixer, an agitator, drum mixer, a stirrer, an impeller, an ultrasonic device, a tumbler, an auger-type screw, a vibrating device, a grinding device, or a surface machining device. Reactor 124 may contain aluminum metal, which may be added to reactor 124 before or after the aqueous fluid is transferred to reactor 124. The aluminum metal may be added to reactor 124 from an aluminum tank 128. The aluminum metal may react with the one or more oxyanions in the aqueous fluid to form one or more ettringites.

A third measurement device 130 may measure the flow rate of the aqueous fluid transferred to reactor 124 and send the measurements to control system 112 via signal path 132. Reactor 124 may include a fourth measurement device 134 that measures one or more properties of the aqueous fluid while the aqueous fluid is in reactor 124, such as the pH, the conductivity, and/or the temperature of the aqueous fluid. As with first second measurement device 110, fourth measurement device 134 may include one or more measurement devices. Fourth measurement device 134 sends the measurements to control system 112 via signal path 136. A fifth measurement device 138 may be located downstream of reactor 124. Fifth measurement device 138 may measure the amount of oxyanions in the aqueous fluid exiting reactor 118 and send the measurements to control system 112 via signal path 140.

Control system 112 may compare measurements from third measurement device 130, fourth measurement device 134, and/or fifth measurement device 138 to one or more setpoints programmed within control system 112. Based on the comparison of the measurement(s) to the setpoint, control system 112 generates an output signal and sends the output signal to one or more components of the system 100, such as tank 106, agitation device 126, aluminum tank 128, one or more flow control valves (not shown), and a heater device, such as a heat exchanger (not shown). The output signal may cause the component of the system 100 that receives the output signal to make an adjustment, which in turn may impact the rate of release of aluminum ions from the aluminum metal in reactor 124.

For example, in the case of tank 106, the output signal from control system 112 via signal path 116 may adjust (e.g., increase or decrease) the amount of the source of calcium ions and/or the base that is added to mixing chamber 102 from tank 106. As discussed above, this adjustment changes the pH of the aqueous fluid and/or the amount of calcium ions in the aqueous fluid that are available to form one or more ettringites, which may impact the rate of release of aluminum ions from the aluminum metal in reactor 124. In the case of agitation device 126, the output signal from control system 112 via signal path 142 may adjust (e.g., increase or decrease) the speed of agitation device 126 in reactor 124. As discussed above, the speed of agitation device 126 impacts the abrading force applied to the aluminum metal in reactor 124. As discussed above, the abrading force affects the amount of precipitate that may be dislodged or removed from the aluminum metal, which may impact the rate of release of aluminum ions from the aluminum metal in reactor 124. In the case of aluminum tank 128, the output signal from control system 112 via signal path 144 may adjust (e.g., increase or decrease) the amount of aluminum added to reactor 124 from tank 128. As discussed above, the addition of aluminum metal to reactor 124 directly increases the rate of release of aluminum ions from the aluminum metal in reactor 124. In the case of a flow control valve (not shown), the output signal from control system 112 may adjust (e.g., open or close) the flow control valve (e.g., between mixing chamber 102 and reactor 124) which affects (e.g., increases or decreases) the flow rate of the aqueous fluid through system 100 and, more particularly, through reactor 124. As discussed above, the flow rate of the aqueous fluid through reactor 124 may impact the rate of release of aluminum ions from the aluminum metal in reactor 124. In the case of a heater (not shown), the output signal from control system 112 may adjust the heater which affects (e.g., increases or decreases) the temperature of the aqueous fluid. As discussed above, the temperature of the aqueous fluid in reactor 124 may impact the rate of release of aluminum ions from the aluminum metal in reactor 124.

System 100 may further include one or more filtration devices 146, a pH adjustment tank 148, and/or a clarifier 150. The aqueous fluid may be transferred from reactor 124 to filtration device 146 in which solids (e.g. ettringites) may be removed or separated from the aqueous fluid. The aqueous fluid then may be transferred from filtration device 146 to pH adjustment tank 148 in which the pH of the aqueous fluid may be decreased. The pH may be adjusted by adding carbon dioxide and/or an acid from a tank 152 to pH adjustment tank 148. Although a single tank is shown at tank 152, separate tanks could be used for the carbon dioxide and the acid. pH adjustment tank 148 may contain a mixing element 160 that mixes the carbon dioxide and/or acid into the aqueous fluid. Mixing element 160 may be one or more of paddle mixers, impellers, such as mixed flow impellers, turbine mixers, such as curved blade turbines, and radial blade turbines, vortex mixers, agitators, such as gear driven agitators, drum mixers, and stirrers.

A sixth measurement device 154 may be operatively coupled to pH adjustment tank 148. Sixth measurement device 154 may measure one or more properties of the aqueous fluid in pH adjustment tank 148, such as the pH or the conductivity of the aqueous fluid. As with first measurement device 110, sixth measurement device 154 may include one or more measurement devices. Sixth measurement device 154 sends the measurements to control system 112 via signal path 156. Control system 112 may compare a measurement from sixth measurement device 154 to one or more setpoints programmed within control system 112. Based on the comparison of the measurement to the setpoint, control system 112 generates an output signal and sends the output signal to tank 152 via signal path 158. The output signal may cause tank 152 to adjust (e.g., increase or decrease) the amount of carbon dioxide or acid added to tank 152, which in turn may affect (e.g., increase or decrease) the pH of the aqueous fluid in the pH adjustment tank.

The aqueous fluid finally may be transferred from pH adjustment tank 148 to clarifier 150, in which sludge or other remaining solids may be removed from the aqueous fluid and returned to filtration device 146.

EXAMPLES

Example 1

Calculation of Raw Materials Needed for Ion Removal

Chemical analysis of the aqueous fluid being treated is determined by any standard method to determine its chemical composition and physical properties of the solution to be treated. Calculations are made to determine the stoichiometric amounts of reactants that are necessary to treat the solution.

The amount of aluminum that will be added to the reactor is roughly calculated based on the oxidation rate of the type and shape of the aluminum being used. This is accomplished by mixing a known amount of aluminum with a calculated stoichiometric amount of lime that is necessary for the ettringite reaction. The aluminum metal and pH-adjusted solution are mixed for a period of time such as one hour while maintaining a substantially constant pH. The aluminum is then washed and weighed to get the weight of aluminum dissolved over the time period of the test. With this calculation the weight of aluminum to be placed in the reactor can be calculated to give the mg/min of aluminum released by the corrosion reaction. This amount can then be matched to the desired flow rate containing the oxyanions to be removed. After a rough surface corrosion rate is determined, the monitoring of pH, specific conductance and oxyanions can be used to control the process.

Calcium from the lime addition is calculated based on the anions to be removed, in this case the sulfate concentration to be removed. Calcium hydroxide or slaked calcium oxide is introduced in to the solution to be treated based on the stoichiometric amounts of calcium and hydroxide needed to make the mineral ettringite form of the sulfate substituted calcium aluminate.

Example 2

Calculating Conductivity (C) Limits for Reaction Control

The control process uses a relation between the desired amount of anions (sulfate) to be removed and conductivity of the reactor solution when this removal target amount is reached. It uses this data to make changes to the aluminum corrosion rate of the aluminum metal mass in the reactor to increase or decrease the available Al+3. These changes include adjusting the quantity of aluminum being added to make up for oxidation loss and adjusting the agitation forces applied to mix the contents of the reactor.

To begin, a desired Sulfate Target is identified ($T_{SO4}$). A sulfate reading is then taken from the incoming raw, i.e., untreated, aqueous fluid ($R_{SO4}$). Lime is added based on theoretical formation of Ettringite as well as other factors in the mixing chamber using the Raw Sulfate reading minus the Target Sulfate ($R_{SO4}$-$T_{SO4}$). This would be the Total Sulfate Removed ($TSR_{SO4}$).

$$TSR_{SO4}=R_{SO4}-T_{SO4}$$

Figure 2:
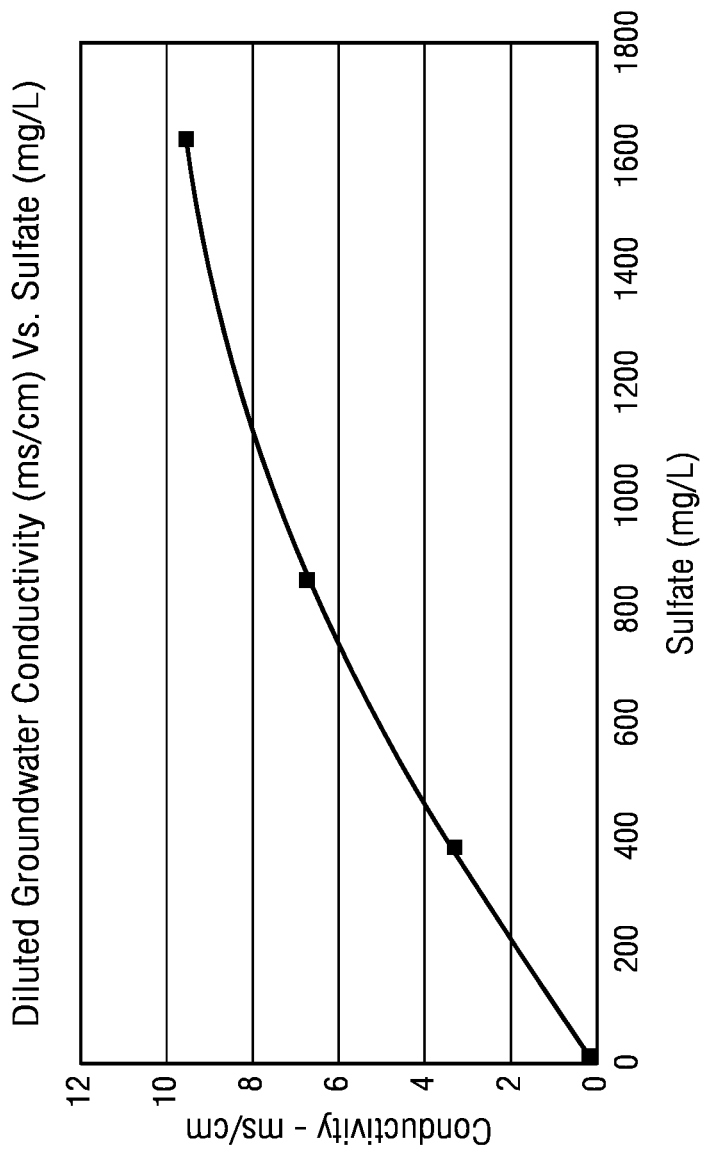
FIG. 2 is a graph showing diluted groundwater conductivity (Ms/cm) vs. sulfate concentration (mg/L). The equation for the curve is $C_{TSR} = -a(TSR_{SO_4}^2) + b(TSR_{SO_4}) - c$. The $C_{TSR}$ value can be compared to the change in conductivity (ΔC) measured from the process according to the equation $CD = C_{TSR} - \Delta C$. Based on the value of $C_D$, the control system can make adjustments that maintain a substantially constant aluminum corrosion rate.

The process control starts by setting up a relationship between the Total Sulfate Removed ($TSR_{SO4}$) and Conductivity of Total Sulfate Removed (Ctsr). This may vary with different types of water. FIG. 2 is a graph showing diluted groundwater conductivity (Ms/cm) vs. sulfate concentration (mg/L). For high sulfate groundwater diluted to give various sulfate concentrations, conductivity values were taken and plotted in FIG. 2 against the sulfate concentration representing the ending treated sulfate concentration desired ($TSR_{SO4}$).

The equation for the line in FIG. 2 is as follows:

$$C_{TSR}=-a(TSR_{SO4}^2)+b(TSR_{SO4})-c.$$

This value ($C_{TSR}$) is then compared to the Delta Conductivity (ΔC) which is the Conductivity of Mixing Chamber ($C_M$) minus Conductivity of Reactor ($C_R$).

$$\Delta C=C_m C_R$$

Comparing the two values, CTSR and AC produces the following equation:

$$C_D=C_{TSR}\Delta C,$$

where the control system will then make necessary adjustments based on the Conductivity Difference ($C_D$). If the value is zero (within certain parameters), no adjustments will be made. If the resultant is positive or negative, the following adjustments will be made:

$C_D$=Negative Value=Increase agitation and/or add aluminum $C_D$=Positive Value=Decrease agitation and/or remove aluminum.

Example 3

Process Steps for Removing Ions in a Reactor

The lime is added and the pH and calcium concentration are measured. Note: a greater amount of lime may be necessary in certain situations due to chemical demand for calcium and hydroxide by the waste being treated. This can be determined by titration of the solution to determine if there is adequate calcium hydroxide available for the reaction. Conductivity (C) and temperature (T) of the solution are also monitored.

The reactor is filled to the overflow with the solution to be treated containing the calcium and hydroxide provided by the lime addition. The pH of the solution is measured to make sure the reactor pH will maintain a selected pH usually between 11.0 and 12.3. If the pH in the reactor is not high enough additional lime may be added to the solution to be treated to hold a substantially constant pH in the reactor.

Aluminum metal is added based on the preliminary corrosion rate testing (see Example 1) and the desired pH needed for proper ion removal level from the aqueous fluid. The aluminum and the limed solution are then mixed. The mixing speed is selected to create adequate mixing and is indicated by continual movement of the aluminum metal in the lower half of the reactor without metal being released from the outlet at the top of the reactor. pH, specific conductance, temperature, sulfate and mixing speed are measured and transmitted to a programmable logic controller (PLC) for control.

The reactor is allowed to mix without flow until the oxyanion (sulfate) has been reduced to the desired treatment level and then flow through the reactor of limed water to be treated is started.

Flow of the solution into the reactor is started and roughly set to match the aluminum corrosion rate determined by the aluminum reaction test (corrosion rate of the aluminum mg/min=mg/min of the oxyanion concentration in the flow rate). If an incoming stream has a sulfate concentration of 600 mg/L then 0.004 moles or 0.112 grams of aluminum is required per liter of solution to treat the aqueous fluid waste stream. If the flow is desired to be 100 ml/min, for this example then 0.0112 grams/min of aluminum must corrode into solution to achieve stoichiometric balance. If we have determined from testing that the aluminum corrosion rate is approximately 0.0037 grams/min per 100 grams of aluminum metal at the pH selected, a multiplier of 3.027 is used (100×3.027) or 302.7 grams of aluminum metal is chosen as the starting point for the amount of aluminum in the reactor to flow at 100 ml/min.

The control process takes into account the flow rate desired and the ability of the reactor to recover from upsets. Using a fixed flow rate to the reactor fixes the reactor influent anion concentration to be treated and matches waste production of the facility where it is being used. Lime is added to the influent flow to maintain a stoichiometric balance between calcium, anions, and hydroxide concentrations. A pH value to operate the reactor can then be chosen to optimize the flow and aluminum corrosion rate in the reactor. Aluminum mass is maintained by adding aluminum metal to the reactor in amounts that replace the theoretical aluminum mass that has precipitated and been lost during a specific time period of reactor operation. The aluminum corrosion rate is set by the reactor pH chosen and increasing or decreasing the available Al3+ in solution at a specific pH is accomplished by increasing or decreasing the mixing force being applied to the reactor. Adding aluminum metal to maintain mass is a gross gravimetric method and precise calculation and control of the increased surface area being added to the reactor is difficult to control. Removal of aluminum from the reactor during operation can also be used to change reactor operation.

After the treated solution exits the reactor, the effluent undergoes a filtration process. Different filtration methods can be used including a filter press, belt press centrifugal press and sand or membrane filtration. The filtered stream can then be carbonated to lower pH, lower TDS and remove excess calcium. This minimal solid can then be sent through a clarifier or similar clarification device and the solid sludge filtered or sent back through the existing filtration system being used. The clean water is then put back in circulation to complete the process.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method of removing one or more oxyanions from an aqueous fluid, comprising:
    determining a corrosion rate for an aluminum metal;
    adding an initial amount of the aluminum metal to a reactor based at least on the determined corrosion rate;
    introducing an aqueous fluid containing one or more oxyanions into the reactor at an initial flowrate, wherein the initial flowrate is based at least on the determined corrosion rate;
    contacting the aqueous fluid containing the one or more oxyanions with the aluminum metal in the reactor whereby aluminum ions are released from the aluminum metal into the aqueous fluid, wherein the one or more oxyanions in the aqueous fluid react with the aluminum ions to form one or more ettringites;
    adjusting one or more parameters to maintain a substantially constant rate of release of the aluminum ions from the aluminum metal in the reactor, wherein the one or more parameters is selected from the group consisting of: a temperature of the aqueous fluid, a conductivity of the aqueous fluid, a pH of the aqueous fluid, a flowrate of the aqueous fluid, a speed of an agitation device, and the initial amount of the aluminum metal present in the reactor; and
    removing at least a portion of precipitated ettringites from the aqueous fluid.

2. The method of claim 1, wherein the one or more oxyanions are selected from the group consisting of: sulfate, chromate, carbonate, sulfite, magnesium, calcium, thiosulfate, selenite, selenate, molybdate, silicate, vanadate, arsenate, chloride, bromide, iodide, fluoride, nitrite, nitrate, manganate, borate, hypochlorite, chlorite, chlorate, perchlorate, iodite, iodate, bicarbonate, acetate, formate, cadmium, sulfamide, hydroxide, and any combination thereof.

3. The method of claim 1 further comprising determining an amount of the one or more oxyanions in the aqueous fluid prior to the one or more oxyanions in the aqueous fluid reacting with the aluminum ions.

4. The method of claim 3, wherein the amount of the one or more oxyanions in the aqueous fluid prior to the one or more oxyanions in the aqueous fluid reacting with the aluminum ions is from about 1 mg/L to about 12,000 mg/L.

5. The method of claim 1 further comprising:
    determining an amount of the one or more oxyanions in the aqueous fluid after the one or more oxyanions in the aqueous fluid react with the aluminum ions.

6. The method of claim 5, wherein from about 5% to about 100% of the one or more oxyanions are removed from the aqueous fluid after the one or more oxyanions in the aqueous fluid react with the aluminum ions.

7. The method of claim 1, wherein the aluminum metal comprises one or more of aluminum scrap, aluminum pellets, aluminum shot, aluminum household products, aluminum flakes, or aluminum turnings.

8. The method of claim 1 further comprising:
    adding a source of calcium ions to the aqueous fluid.

9. The method of claim 8, wherein the molar ratio of the source of calcium ions added to the aqueous fluid to the oxyanions in the aqueous fluid is greater than 2:1.

10. The method of claim 8, wherein an amount of the source of calcium ions added to the aqueous fluid is based on at least one of an amount of the one or more oxyanions in the aqueous fluid and an amount of the one or more oxyanions to be removed from the aqueous fluid.

11. The method of claim 8, wherein the source of calcium ions comprises one or more of calcium hydroxide or slaked calcium oxide.

12. The method of claim 8, wherein the ratio of the one or more oxyanions to calcium ions in the aqueous fluid is greater than or equal to 0.5:1.

13. The method of claim 1 further comprising:
    adding a base to the aqueous fluid to increase the pH of the aqueous fluid.

14. The method of claim 13, wherein the base is selected from the group consisting of: sodium hydroxide, potassium hydroxide, calcium hydroxide, ammonium hydroxide, magnesium hydroxide, and any combination thereof.

15. The method of claim 13, wherein the pH of the aqueous fluid is increased to greater than or equal to about 11.

16. The method of claim 13, wherein the base is a source of calcium ions.

17. The method of claim 1, wherein the aluminum metal has a surface area from about 1 $cm^2$ to about 100 $cm^2$ per mg of the one or more oxyanions that react with the aluminum ions each minute.

18. The method of claim 1, wherein the initial amount of the aluminum metal is based on at least one of an amount of the one or more oxyanions in the aqueous fluid and an amount of the one or more oxyanions to be removed from the aqueous fluid.

19. The method of claim 1 further comprising:
    monitoring one or more properties of the aqueous fluid selected from the group consisting of: the temperature of the aqueous fluid, the conductivity of the aqueous fluid, the pH of the aqueous fluid, and an amount of the one or more oxyanions in the aqueous fluid.

20. The method of claim 1, wherein the substantially constant rate of release of aluminum ions is from about 0.18 mg/min to about 6 mg/min per mg of the one or more oxyanions that react with the aluminum ions.

21. The method of claim 1, wherein a second precipitate forms on at least one surface of the aluminum metal, wherein the one or more parameters is the speed of the agitation device, and wherein at least a portion of the second precipitate from the surface of the aluminum metal is removed when the speed of the agitation device is adjusted.

22. The method of claim 21 further comprising: generating an abrading force that contacts the portion of the second precipitate on the surface of the aluminum metal.

23. The method of claim 22, wherein the abrading force is generated by the agitation device.

24. The method of claim 1, wherein the agitation device comprise one or more of: a mixing element, a paddle mixer, turbine mixer, vortex mixer, an agitator, drum mixer, a stirrer, an impeller, an ultrasonic device, a tumbler, an auger-type screw, a vibrating device, a grinding device, a pump, or a surface machining device.

25. The method of claim 1, wherein the one or more parameters is the speed to the agitation device.

26. The method of claim 25, wherein the speed of the agitation device is from about 1 rpm to about 1,000 rpm.

27. The method of claim 1, wherein the one or more parameters is the temperature of the aqueous fluid.

28. The method of claim 27, wherein the temperature of the aqueous fluid is from about 0° C. to about 100° C.

29. The method of claim 1, wherein the one or more parameters is the amount of aluminum metal present in the reactor.

30. The method of claim 29, wherein the aluminum metal has a surface area from about 1 $cm^2$ to about 100 $cm^2$ per mg of the one or more oxyanions that react with the aluminum ions each minute.

31. The method of claim 1, wherein the one or more parameters is the pH of the aqueous fluid.

32. The method of claim 31, wherein the pH of the aqueous fluid is from about 10 to about 13.

33. The method of claim 1, wherein the one or more parameters is the flow rate of the aqueous fluid that contacts the aluminum metal.

34. The method of claim 33, wherein the flow rate of the aqueous fluid is from about 1.0 mL/min to about 500,000 L/min.

35. The method of claim 1, wherein the portion of the precipitated ettringites is removed from the aqueous fluid using one or more filtration devices.

36. The method of claim 35, wherein the one or more filtration devices comprise one or more of a filtrate tank, a settler, a filter press, a micro filter, a centrifugal filter, or a gravity filter.

37. The method of claim 35 further comprising:
adjusting the pH of the aqueous fluid after removing the portion of the precipitated ettringites from the aqueous fluid.

38. The method of claim 37, wherein the pH of the aqueous fluid is adjusted to from about 6 to about 8.

39. The method of claim 35 further comprising:
clarifying the aqueous fluid after removing the portion of the precipitated ettringites from the aqueous fluid.

40. The method of claim 39 wherein the aqueous fluid is clarified by adding carbon dioxide to the aqueous fluid.

41. The method of claim 40 wherein the amount of carbon dioxide to the aqueous fluid is from about 1 mg/L to about 500 mg/L.

42. The method of claim 1, wherein hydrogen gas is generated as a byproduct when the precipitated ettringites are formed, and wherein the method further comprises collecting the hydrogen gas.

43. The method of claim 42, further comprising:
heating the aqueous fluid with the collected hydrogen gas.

44. A method of removing one or more oxyanions from an aqueous fluid, comprising:
means for determining a corrosion rate of an aluminum metal;
means for adding an initial amount of the aluminum metal to a reactor based at least on the determined corrosion rate;
means for introducing an aqueous fluid containing one or more oxyanions into the reactor at an initial flowrate, wherein the initial flowrate is based at least on the determined corrosion rate;
means for contacting the aqueous fluid containing one or more oxyanions with the aluminum metal in the reactor whereby aluminum ions are released from the aluminum metal into the aqueous fluid, wherein the one or more oxyanions in the aqueous fluid react with the aluminum ions to form one or more ettringites;
means for adjusting one or more parameters to maintain a substantially constant rate of release of the aluminum ions from the aluminum metal in the reactor, wherein the one or more parameters is selected from the group consisting of: a temperature of the aqueous fluid, a conductivity of the aqueous fluid, a pH of the aqueous fluid, a flowrate of the aqueous fluid, a speed of an agitation device, and the initial amount of the aluminum metal present in the reactor; and
means for removing precipitated ettringites from the aqueous fluid.

45. The method of claim 1, further comprising:
varying the initial flowrate based at least on an amount of the one or more oxyanions in the aqueous fluid.

46. The method of claim 1, wherein the substantially constant rate of release of the aluminum ions is substantially the same as the determined corrosion rate.

* * * * *